(12) United States Patent
Betzen

(10) Patent No.: US 10,342,186 B2
(45) Date of Patent: Jul. 9, 2019

(54) MECHANISM FOR ALIGNING IRRIGATION SYSTEMS USED FOR FARM CROPS

(71) Applicant: Nathan Betzen, Hereford, TX (US)

(72) Inventor: Nathan Betzen, Hereford, TX (US)

(*) Notice: Subject to any disclaimer, the term of this patent is extended or adjusted under 35 U.S.C. 154(b) by 164 days.

(21) Appl. No.: 15/186,090

(22) Filed: Jun. 17, 2016

(65) Prior Publication Data
US 2016/0366840 A1    Dec. 22, 2016

Related U.S. Application Data

(60) Provisional application No. 62/181,360, filed on Jun. 18, 2015.

(51) Int. Cl.
*A01G 25/09* (2006.01)

(52) U.S. Cl.
CPC .................. *A01G 25/092* (2013.01)

(58) Field of Classification Search
CPC ....... A01G 25/092; A01G 25/16; A01G 25/09
See application file for complete search history.

(56) References Cited

U.S. PATENT DOCUMENTS

| | | | | |
|---|---|---|---|---|
| 4,172,551 A * | 10/1979 | Johnson | ............... | A01G 25/097 180/168 |
| 6,755,362 B2 * | 6/2004 | Krieger | ............... | A01G 25/092 239/731 |
| 8,777,133 B2 * | 7/2014 | Korus | .................. | A01G 25/095 239/726 |
| 9,101,097 B2 * | 8/2015 | Malsam | ............... | A01G 25/095 |
| 2013/0008977 A1 * | 1/2013 | Pfrenger | ............... | A01G 25/092 239/69 |
| 2013/0090772 A1 * | 4/2013 | Pfrenger | .................. | G05D 3/12 700/284 |
| 2014/0371971 A1 * | 12/2014 | Welch | .................. | A01G 25/092 701/23 |

FOREIGN PATENT DOCUMENTS

EP            0040828 A1    2/1981

* cited by examiner

*Primary Examiner* — Faye M Fleming
(74) *Attorney, Agent, or Firm* — Chainey P. Singleton

(57) ABSTRACT

The present invention is a wind adjustment device that takes into account the wind pushing against the surface of the water pipe mainline segments and elongated truss spans located between the mobile support towers. Although there are currently mechanisms to take into account alignment issues with the mobile support towers there are currently no mechanisms to take into account the curvature of the water pipe mainline segments and elongated truss spans located between the mobile support towers as a result of the wind pushing on the surface.

12 Claims, 17 Drawing Sheets

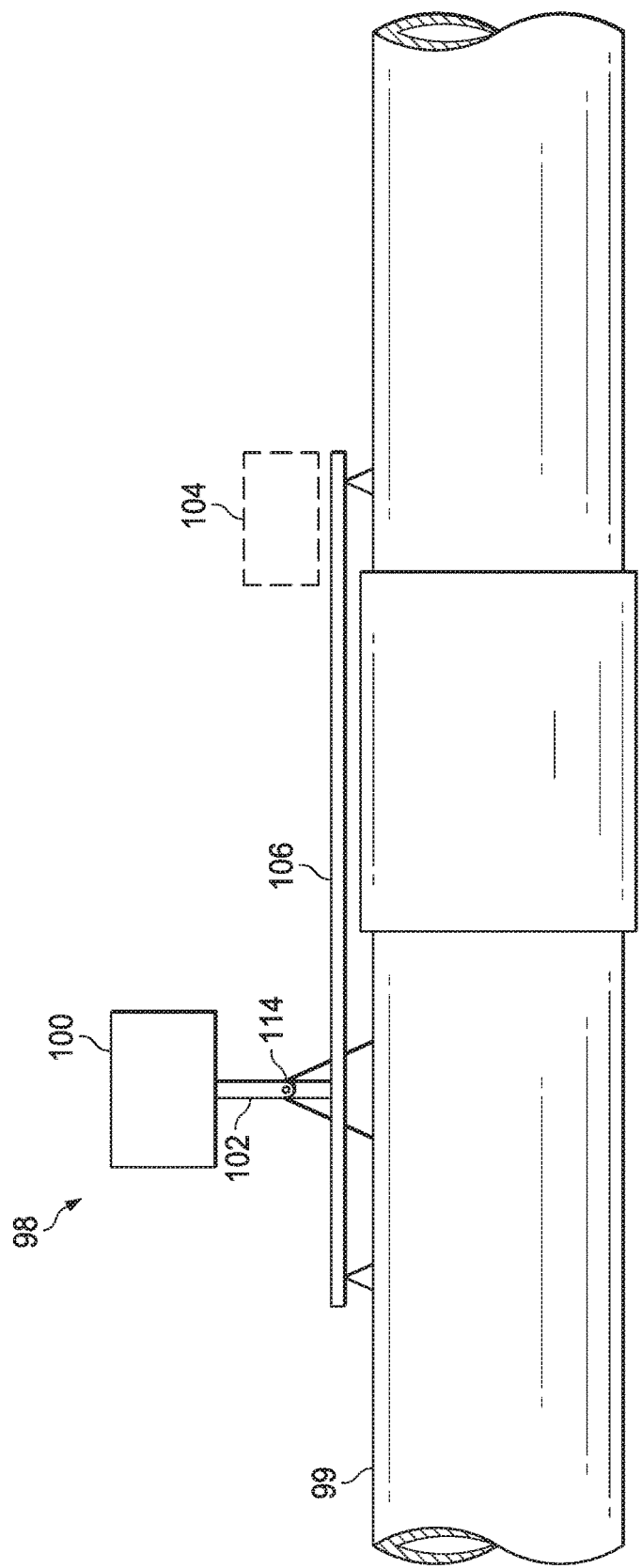

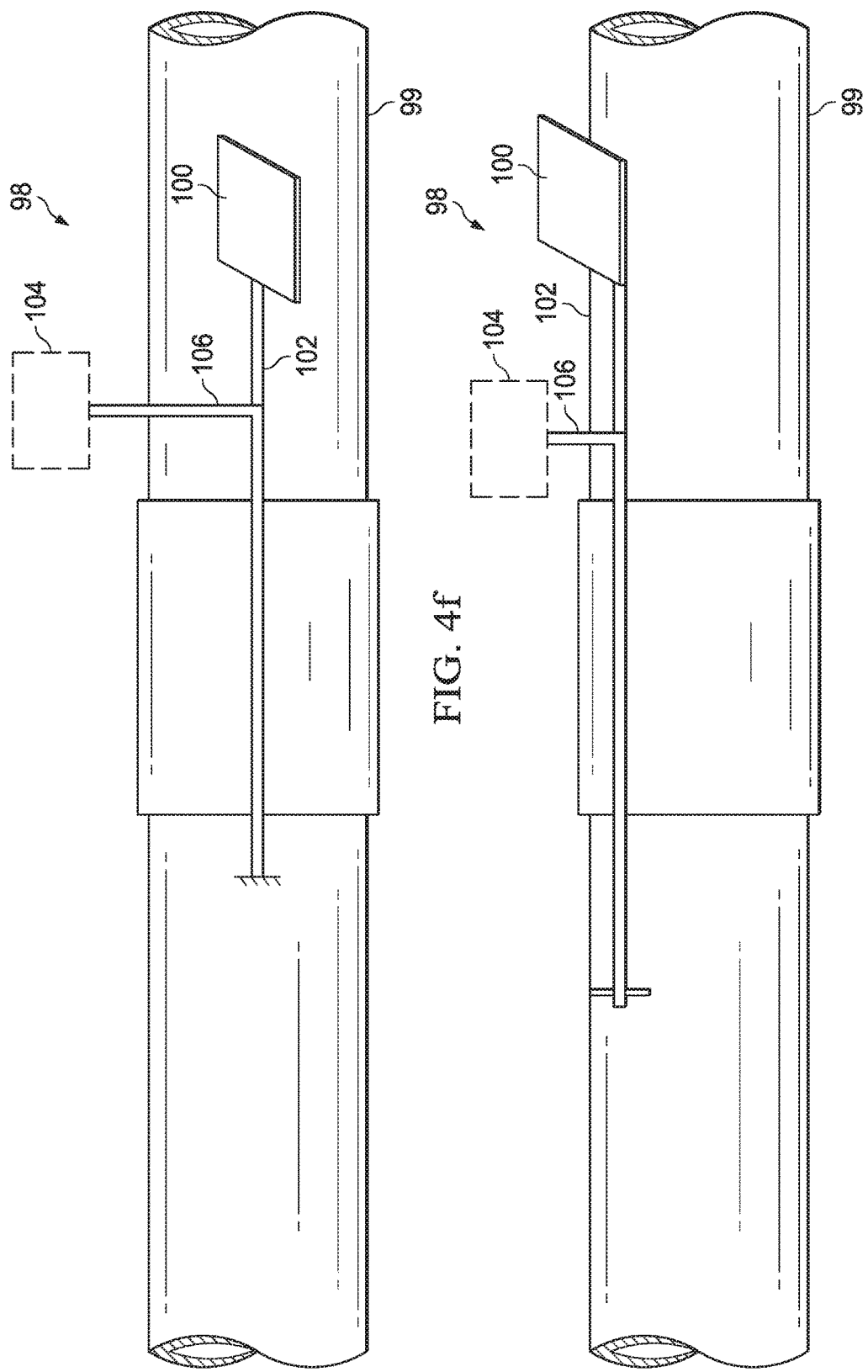

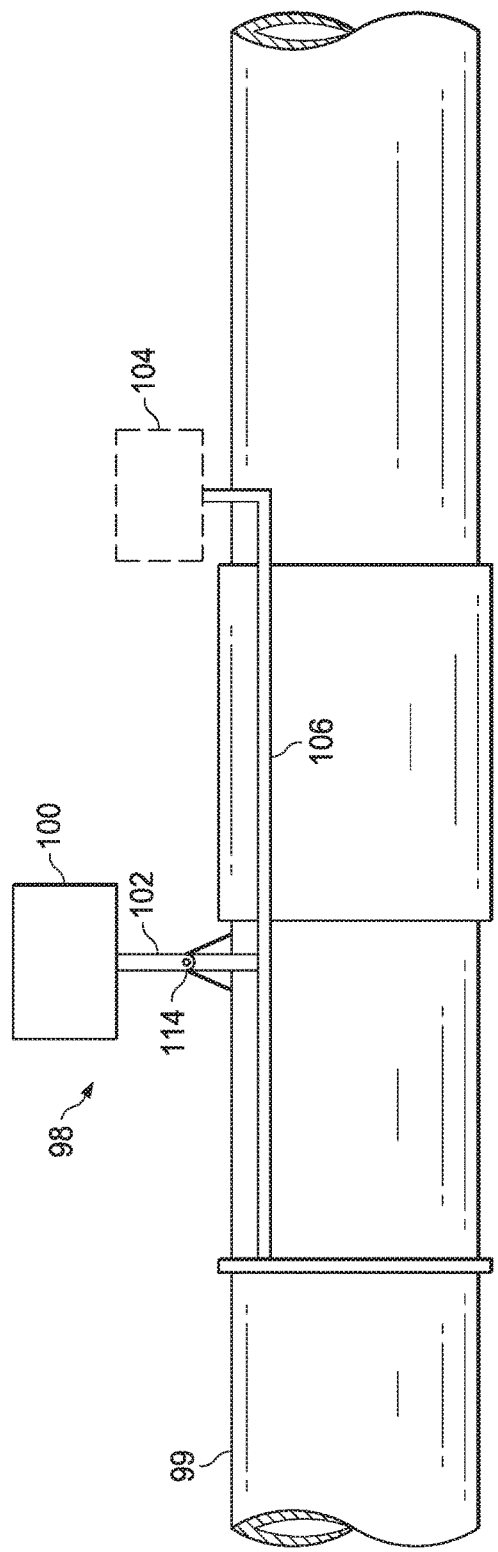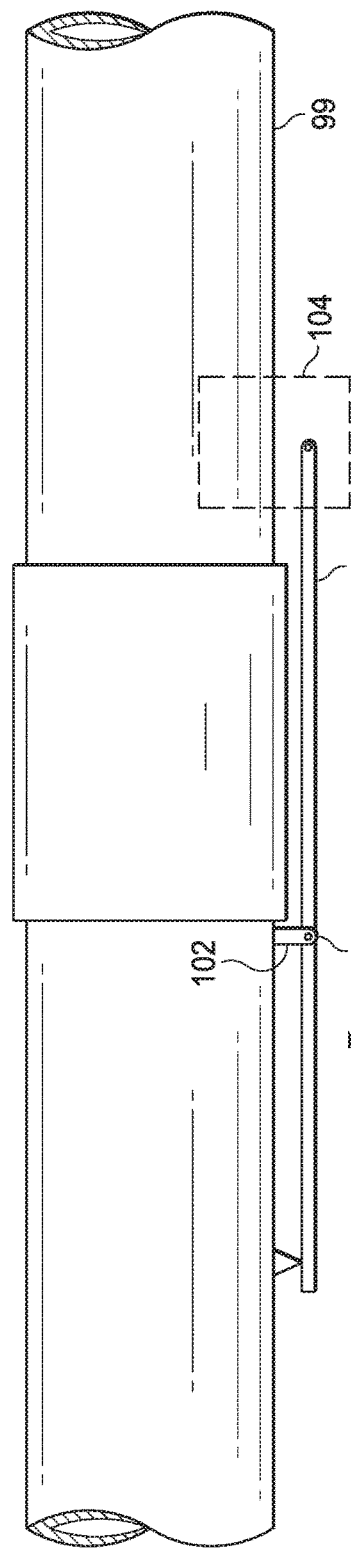

| BEAM AND LOADING | ELASTIC CURVE | MAXIMUM DEFLECTION | SLOPE AT END |
|---|---|---|---|
| 1 (cantilever with point load P at end, length L) | y, L, $y_{max}$ | $-\dfrac{PL^3}{3EI}$ | $-\dfrac{PL^2}{2EI}$ |
| 3 (cantilever with moment M at end, length L) | y, L, $y_{max}$ | $-\dfrac{ML^2}{2EI}$ | $-\dfrac{ML}{EI}$ |
| 4 (simply supported beam with P at midspan $\tfrac{1}{2}L$) | y, L, $\tfrac{1}{2}L$, $y_{max}$ | $-\dfrac{PL^3}{48EI}$ | $\pm\dfrac{PL^2}{16EI}$ |
| 5 (simply supported beam A–B with P at distance a from A, b from B) | y, L, a, b, $x_m$, $y_{max}$ | FOR $a > b$: $-\dfrac{Pb(L^2-b^2)^{3/2}}{9\sqrt{3}EIL}$ at $x_m = \sqrt{\dfrac{L^2-b^2}{3}}$ | $\theta_A = -\dfrac{Pb(L^2-b^2)}{6EIL}$ $\theta_B = +\dfrac{Pa(L^2-a^2)}{6EIL}$ |
| 6 (simply supported beam with uniform load w over length L) | y, L, $\tfrac{1}{2}L$, $y_{max}$ | $-\dfrac{5\omega L^4}{384EI}$ | $\pm\dfrac{\omega L^3}{24EI}$ |

FIG. 8

MECHANISM FOR ALIGNING IRRIGATION SYSTEMS USED FOR FARM CROPS

CROSS-REFERENCE TO RELATED APPLICATIONS

This patent application is a non-provisional patent application of U.S. provisional patent application 62/181,360 filed on Jun. 18, 2015 and entitled "Mechanism for Aligning Irrigation Systems Used for Farm Crops", which is hereby incorporated by reference in its entirety.

TECHNICAL FIELD OF THE INVENTION

The present invention relates generally to methods and devices used in farming operations for farm crops and similar environments requiring irrigation operations and, more particularly, to irrigation and conveyance systems that function cooperatively, and accomplish conveying operations to provide irrigation for crops.

STATEMENT OF FEDERALLY FUNDED RESEARCH

None.

INCORPORATION-BY-REFERENCE OF MATERIALS FILED ON COMPACT DISC

None.

BACKGROUND OF THE INVENTION

Without limiting the scope of the invention, its background is described in connection with farming operations and more specifically mechanically irrigation of farm land area during the growing season.

There is an increasing need for farm products resulting in an increase in farming operations on an industrial scale as compared to the smaller farming operations of the past. In order to reduce the overall labor costs and increase the farm product yield, farming operations are becoming more mechanized. One example is the use of mechanical irrigation of crops during particular portions of the growing season when the amount of rainfall is less than desirable.

SUMMARY OF THE INVENTION

The present invention is a wind adjustment device that takes into account the wind pushing against the surface of the water pipe mainline segments and elongated truss spans located between the mobile support towers. Although there are currently mechanisms to take into account misalignment issues with the mobile support towers, there are currently no mechanisms to take into account the curvature of the water pipe mainline segments and elongated truss spans located between the mobile support towers as a result of the wind pushing on the surface.

The present invention provides an apparatus for aligning a lateral move or center pivot irrigation system for use in irrigating crops, and to account for misalignments due to wind, having at least a portion of an irrigation system comprising at least two spaced towers on wheels operable to transport said towers through a field as a unit, wherein each of the at least two spaced towers comprise a tower with a base resting on wheels, a drive motor in communication with at least one of the wheels to move each tower through the field, a motor control mechanism connected to the drive motor to control the direction and speed or timing of the drive motor, a conduit structure connected to the tower and spanning to an adjacent tower, a flexible conduit connection to connect each conduit structure to the adjacent conduit structure, an alignment sensing mechanism connected to the conduit structure to determine variation in the conduit caused by the tower lagging behind or moving ahead of the adjacent tower, a conduit alignment control mechanism connected to the alignment sensing mechanism and the motor control mechanism to control the direction and speed or timing of the drive motor to move each tower through the field and maintain the alignment of the conduit structure, and in response to the alignment sensing mechanism, the conduit alignment control mechanism stops the drive motor of the tower if the tower is ahead of the adjacent tower or starts the drive motor if the tower is behind of the adjacent tower, in the case of in internment controlled irrigation system, or by adjusting the speed of the towers in the case of a continual movement system, until the alignment is re-established; and a wind sensing mechanism connected to the alignment sensing mechanism to determine the force and direction of the wind and in communication with a wind alignment control mechanism, wherein the wind alignment control mechanism is in communication with the motor control mechanism to respond to the wind and provide an alignment correction. By acting on the wind sensing mechanism, the wind alignment control mechanism controls the direction and speed of the drive motor to move each tower through the field and maintain the alignment of the conduit structure.

The present invention provides a method of aligning a lateral move or center pivot irrigation system for use in irrigating crops to account for wind, by providing an irrigation system comprising at least two spaced towers on wheels operable to transport said towers through a field as a unit, wherein each of the at least two spaced towers comprise a tower with a base resting on wheels, a drive motor in communication with at least one of the wheels to move each tower through the field, a motor control mechanism connected to the drive motor to control the direction and speed or timing of the drive motor, a conduit structure connected to the tower and spanning to an adjacent tower, a flexible conduit connection to connect each conduit structure to the adjacent conduit structure, an alignment sensing mechanism connected to the conduit structure to determine variation in the conduit caused by the tower lagging behind or moving ahead of the adjacent tower, a conduit alignment control mechanism connected to the alignment sensing mechanism and the motor control mechanism to control the direction and speed or timing of the drive motor to move each tower through the field and maintain the alignment of the conduit structure, and in response to the alignment sensing mechanism, the conduit alignment control mechanism stops the drive motor of the tower if the tower is ahead of the adjacent tower or starts the drive motor if the tower is behind of the adjacent tower, until the alignment is re-established; and a wind sensing mechanism connected to the conduit structure to determine the force and direction of the wind and in communication with a wind alignment control mechanism, wherein the wind alignment control mechanism is in communication with the motor control mechanism to respond to the wind acting on the wind sensing mechanism the wind alignment control mechanism controls the direction and speed or timing of the drive motor to move each tower through the field and maintain the alignment of the conduit structure; moving the wind sensing mechanism in a first direction and a first distance in response to a wind force;

communicating the first direction and the first distance to the wind alignment control mechanism and the motor control mechanism; and activating the drive motor to move the tower through the field to maintain the alignment of the conduit structure and to counter the wind.

BRIEF DESCRIPTION OF THE DRAWINGS

For a more complete understanding of the features and advantages of the present invention, reference is now made to the detailed description of the invention along with the accompanying figures and in which:

FIGS. 4a-4i show the connection between the wind force capture geometry and the alignment linkage.

FIG. 8 shows the beam deflection equations to show the ideal situation for building a wind correction device.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

Figure 1:
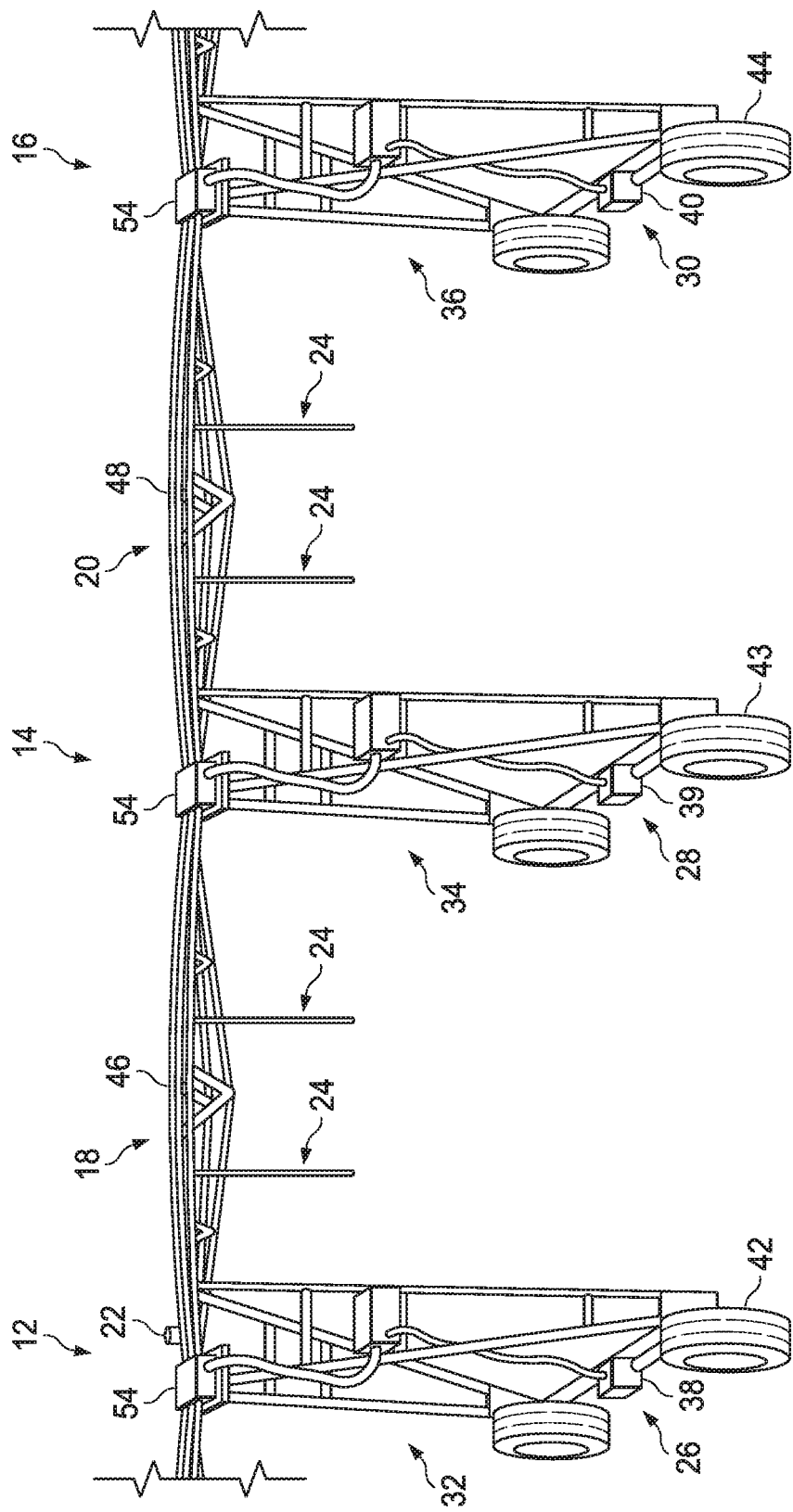
FIG. 1 is an elevation view of a farm crop servicing mechanism showing the mechanism in the form of lateral or center pivot move apparatus.

FIG. 1 is a perspective view of a farm crop irrigation mechanism showing the mechanism in the form of a lateral or center pivot moving apparatus, and further showing two complete truss spans together with a portion of a third truss span. For simplicity sake, the scale and number of truss spans has been limited but will be understood to encompass numerous truss spans. FIG. 1 is a perspective view of a general irrigation device which moves in a linear or center pivot direction. The device provides a crop irrigation device for providing irrigation to fields while minimizing the labor requirements that are ordinarily necessary for such farming operations. In accordance with this invention, the irrigation device includes mobile support towers 12, 14, and 16. Positioned between the tower mechanisms 12, 14, and 16 are elongated truss spans 18 and 20. Each of the elongated truss spans 18 and 20 incorporate a water distribution conduit 22. Depending upon the irrigation operations involved, the water supply conduit 22 will include numerous sprinkler heads on a drop line 24 that are located in spaced relation along the entire length of the water distribution conduit. The water for irrigation is caused to flow through the irrigation conduit 20 under pressure, and as the water emerges from the irrigation heads, is sprinkled or sprayed onto the land area. Distribution of water onto the land is not limited to the sprinkling or spraying method illustrated herein. Each of the mobile support towers 12, 14, and 16 include a support framework structure (e.g., generally triangular) 32, 34 and 36 having tower drive mechanisms 26, 28 and 30 that include one or more drive motors 38, 39 and 40 positioned at the lower extremity of the support framework structure 32, 34 and 36 and providing motive power for controlled rotation of the drive wheels 42, 43 and 44. The respective drive wheels 42, 43 and 44 and one or more drive motors 38, 39 and 40 therefor are of reversible nature, and may be oriented in any suitable manner in relation to the support framework structure 32, 34 and 36, depending upon the particular design of the system involved. For example, the drive motors 38, 39 and 40 and drive wheels 42, 43 and 44 are illustrated in one oriented and the respective truss spans may be oriented in any suitable manner so as to locate the respective conveyors in condition to convey the mobile support towers 12, 14, and 16 are elongated truss spans 18 and 20 either to or from the land or area being irrigated. The spaced support framework structure 32, 34 and 36 may include other transverse braces or brace elements to support the elongated truss spans 18 and 20. To facilitate the relative movement between the mobile support towers 12, 14, and 16 and the elongated truss spans 18 and 20, flexible inserts (not shown) connect the adjacent water pipe mainline segments (not shown). The flexible inserts allow the water pipe mainline segments to maintain a fluid connection while allowing movement of the mobile support towers. The mobile support towers move independently and may have variations in the alignment due to variations in the position of the mobile support towers.

Figure 2:
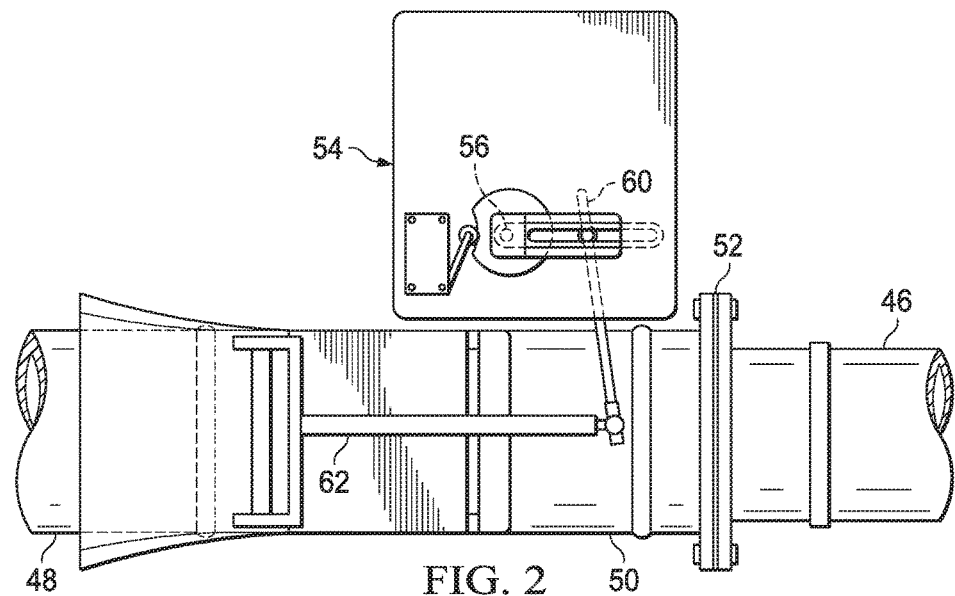
FIG. 2 is a top view of the junction between adjacent water pipe mainline segments.
Figure 3:
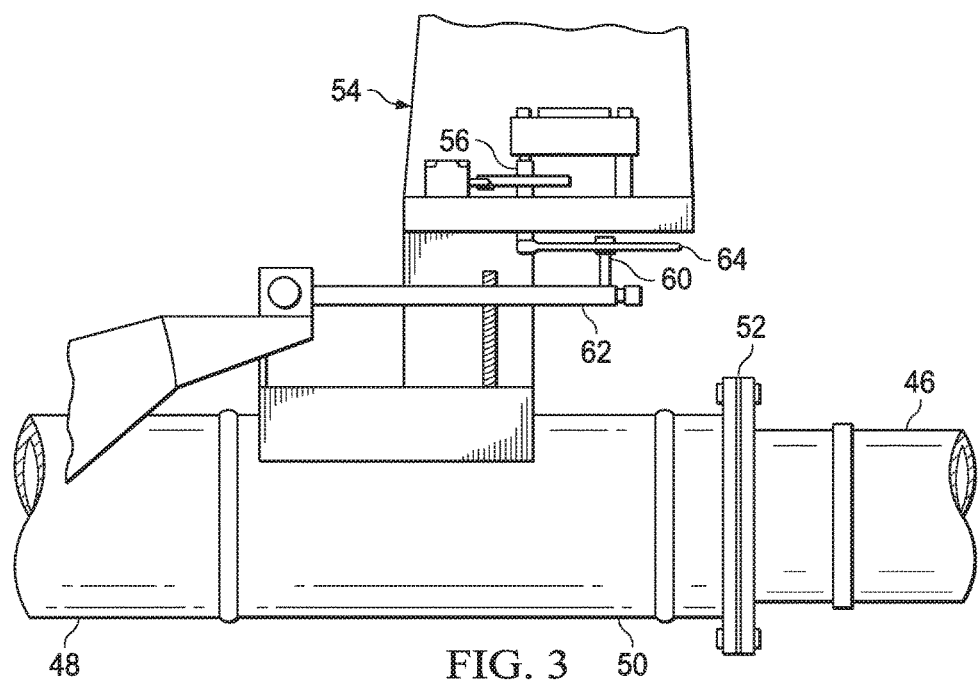
FIG. 3 is a side view of the junction between adjacent water pipe mainline segments.

FIG. 2 is a top view of the junction between adjacent water pipe mainline segments showing the motor controller. FIG. 3 is a side view of the junction between adjacent water pipe mainline segments showing the motor controller. The adjacent water pipe mainline segments 46 and 48 are coupled by a flexible insert 50. The flexible inserts 50 is secured to the water pipe mainline 46 and 48 by a gasket 52 bolted in place to allow the non-uniformed movement of the adjacent water pipe mainline segments 46 and 48. In addition, a motor controller 54 is positioned on the irrigation device 10 to control the direction and the duration of the operation of the one or more drive motors (not shown) positioned at the lower extremity of the support framework structure (not shown) to cause a motive power for controlled rotation of the drive wheels (not shown). The motor controller 54 functions as a forward/reverse limit switch so that there is one circuit for forward movement of the system and another, separate circuit, for reverse movement. The rotating shaft of the limit switch 56 has attached to it a slotted switch extension arm 64 which moves by means of a connecting rod 60 and an actuating arm 62 in accordance with any forward or backward misalignment of adjacent span sections. Regardless of whether the system is moving in a forward direction or reverse direction, when a tower falls behind or is misaligned, the shaft 56 of the switch on the adjacent towers rotate, causing the motors of the adjacent towers to stop until the lagging tower returns to the correct alignment. Once the correct alignment is reestablished, all of the motors of all the motorized towers are stopped. Their circuits are then re-activated, and the towers are moved uniformly to the original constant speed or the desired location. If a tower moves ahead, the shaft 56 activates the circuit and likewise causes the tower motor of that particular tower to stop, allowing the other towers to catch up. The stopping and starting of the tower motors occurs within a matter of seconds so as to minimize the amount of time that any single tower is not moving at a constant rate down the field and minimizing the misalignment of the towers. It will be noted that attached to the rotating shaft of the switch 56 is also a safety switch if the misalignment of towers becomes too great, thereby shutting off all motor controllers and motors. In addition, other programmable controllers and valves known to be used on irrigation devices can be incorporated into the irrigation device. FIGS. 2 and 3 are for generic understanding only, the wind correction device is able to work on virtually any alignment system by applying a force, obtained from the wind, to the alignment linkage in such a manner that the linkage is strained such that the strain on the linkage counters the strain on the sprinkler span, such that overall alignment of the irrigation system is virtually not compromised by forces caused from the wind.

Figure 4A:
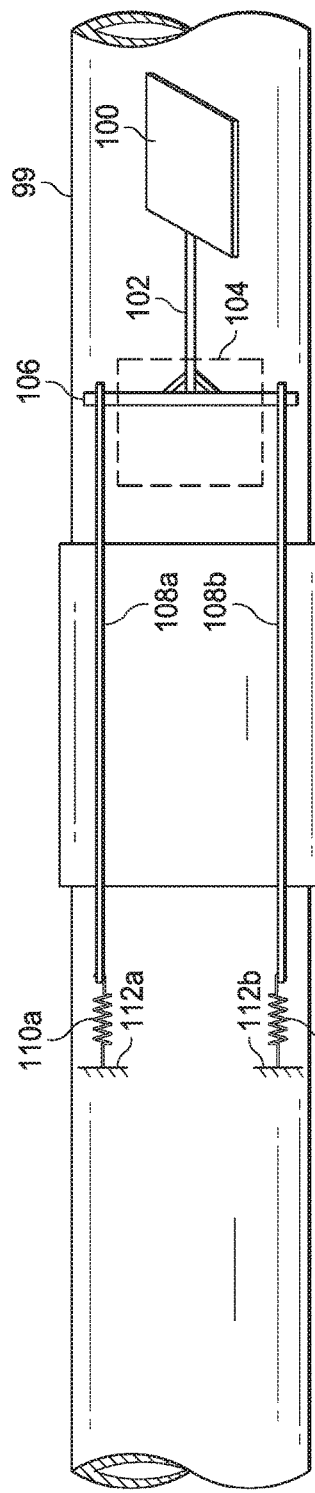

FIGS. 4*a*-4*i* show schematics of the junction between the wind force capture geometry and the alignment linkage. FIG. 4*a* shows one embodiment of the wind alignment mechanism of the present invention. The wind alignment mechanism 98 is mounted on the structural component 99. A wind capture surface 100 is connected through extension rod 102. The extension rod 102 is operably connected to the tower box 104 which includes or is connected to the motor controller. An angular connection rod 106 is perpendicularly connected to the extension rod 102 with tension mechanism 108*a* and 108*b* extending from the end of the angular connection rod 106. The tension mechanism 108*a* and 108*b* each include a spring 110*a* and 110*b* prior to the attachment to the structural component 99. Although the angular connection rod 106 is shown as connected perpendicularly any angle may be used to connect the angular connection rod to the extension rod 102.

Figure 4B:
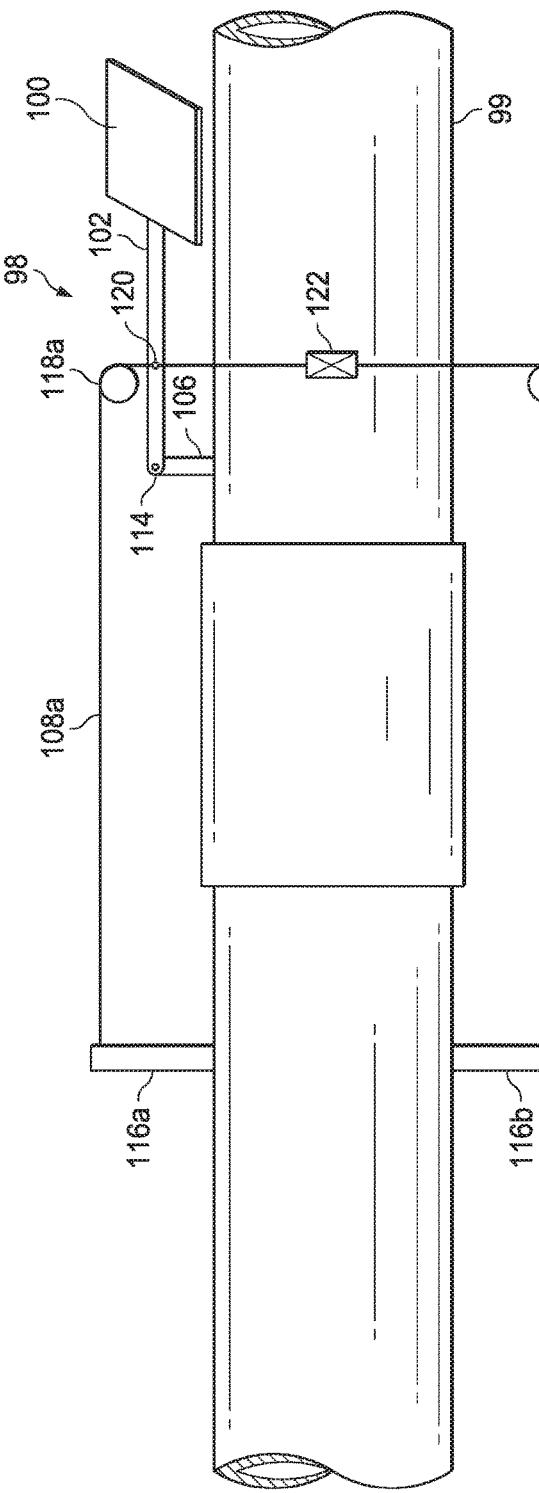

FIG. 4*b* shows one embodiment of the wind alignment mechanism of the present invention for a hydraulically driven system. The wind alignment mechanism 98 is mounted on the structural component 99. A wind capture surface 100 is connected through extension rod 102. The connection rod 102 is connected to the angular connection rod 106 through pivot 114. The angular connection rod 106 is perpendicularly connected to the extension rod 102 but may be connected at any angle. The tension mechanism 108*a* and 108*b* are connected at one end to the tension mechanism connection device 116*a* and 116*b* and extend through guides 118*a* and 118*b* to connect to the extension rod 102 at connection 120. A control valve 122 is connected to the tension mechanism 108*a* and 108*b* to detect the movement of the tension mechanism 108*a* and 108*b* which detects the movement of the extension rod 102 and wind capture surface 100. The control valve 122 is in communication with the drive motors to actuate the drive motors.

FIG. 4*c* is a side view that shows one embodiment of the wind alignment mechanism of the present invention. The wind alignment mechanism 98 is mounted on the structural component 99. A wind capture surface 100 is connected through extension rod 102. The extension rod 102 is operably connected to the tower box 104 which includes or is connected to the motor controller by the angular connection rod 106 which is perpendicularly connected to the extension rod 102. Pivot 114 is located on the extension rod 102 to allow the extension rod 102 to pivot as a result of the interaction of the capture surface 100 with the wind.

Figure 4D:
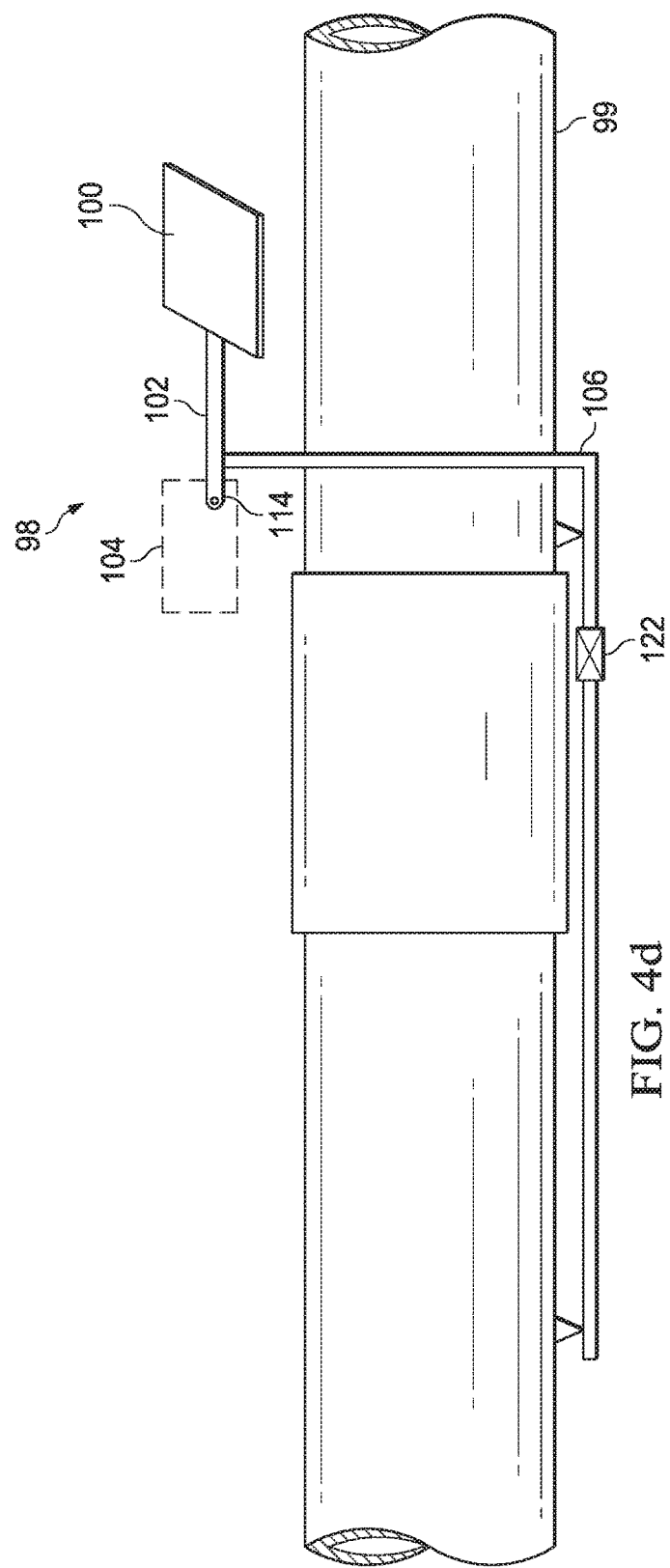

FIG. 4*d* is a top view that shows one embodiment of the wind alignment mechanism of the present invention. The wind alignment mechanism 98 is mounted on the structural component 99. A wind capture surface 100 is connected through extension rod 102. The extension rod 102 is operably connected to the tower box 104 which includes or is connected to the motor controller 54 (not shown) by the angular connection rod 106 which is perpendicularly connected to the extension rod 102 and includes extension rod 122. Pivot 114 is located on the extension rod 102 to allow the extension rod 102 to pivot as a result of the interaction of the capture surface 100 with the wind.

Figure 4E:
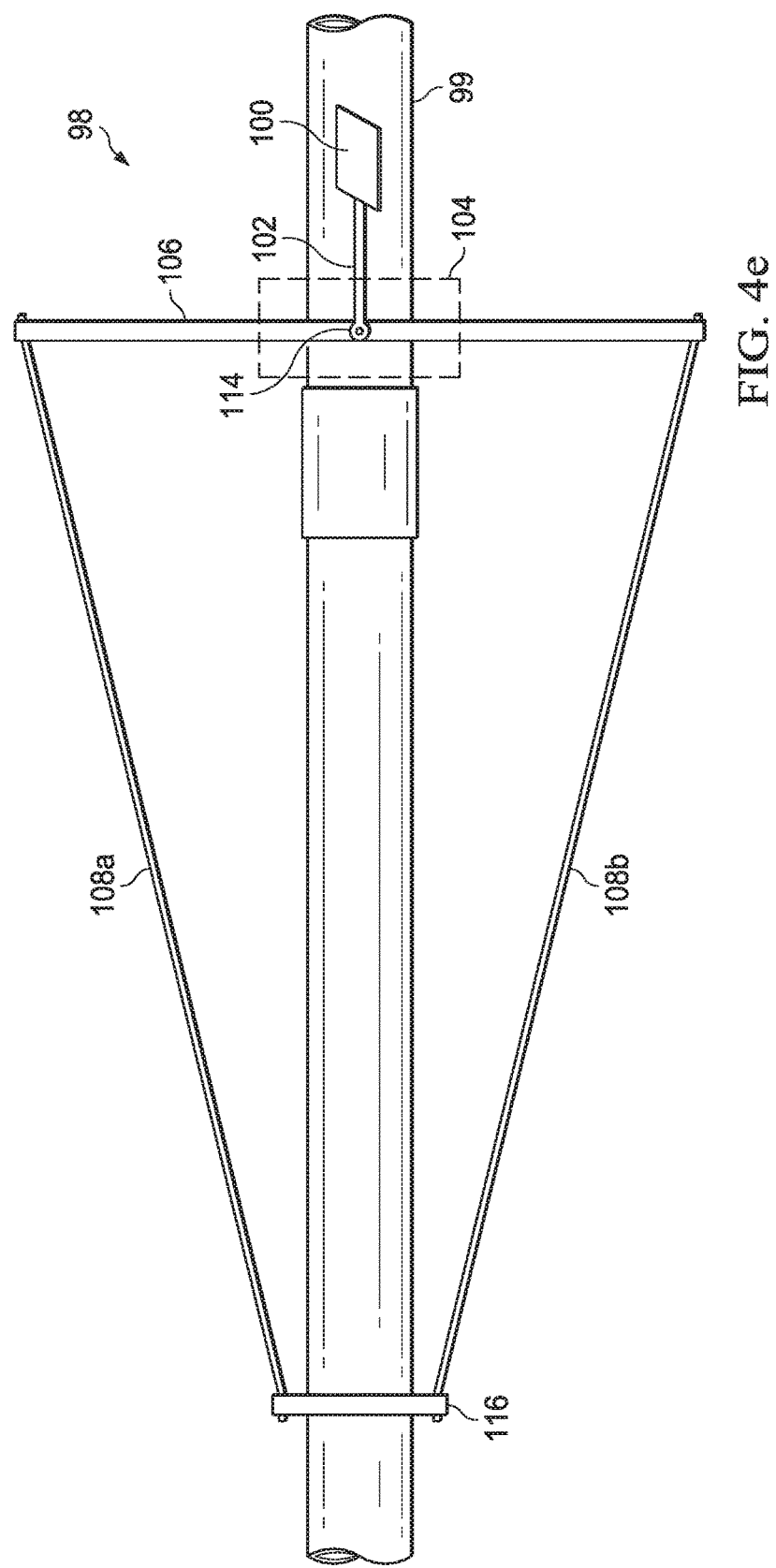

FIG. 4*e* shows one embodiment of the wind alignment mechanism of the present invention. The wind alignment mechanism 98 is mounted on the structural component 99. A wind capture surface 100 is connected through extension rod 102 and includes pivot 114. The extension rod 102 is operably connected to the tower box 104 which includes or is connected to the motor controller. An angular connection rod 106 is perpendicularly connected to the extension rod 102 with tension mechanism 108*a* and 108*b* extending from the end of the angular connection rod 106. The tension mechanism 108*a* and 108*b* each attach to the mechanism connection device 116. Although the angular connection rod 106 is shown as connected perpendicularly any angle may be used to connect the angular connection rod to the extension rod 102.

FIG. 4*f* shows one embodiment of the wind alignment mechanism of the present invention. The wind alignment mechanism 98 is mounted on the structural component 99. A wind capture surface 100 is connected through extension rod 102. The extension rod 102 is operably connected to the tower box 104 which includes or is connected to the motor controller by the angular connection rod 106 which is perpendicularly connected to the extension rod 102. The extension rod 102 moves as a result of the interaction of the capture surface 100 with the wind.

FIG. 4*g* shows one embodiment of the wind alignment mechanism of the present invention. The wind alignment mechanism 98 is mounted on the structural component 99. A wind capture surface 100 is connected through extension rod 102. The extension rod 102 is operably connected to the tower box 104 which includes or is connected to the motor controller by the angular connection rod 106 which is perpendicularly connected to the extension rod 102. The extension rod 102 moves as a result of the interaction of the capture surface 100 with the wind.

FIG. 4*h* is a side view that shows one embodiment of the wind alignment mechanism of the present invention. The wind alignment mechanism 98 is mounted on the structural component 99. A wind capture surface 100 is connected through extension rod 102. The extension rod 102 is operably connected to the tower box 104 which includes or is connected to the motor controller by the angular connection rod 106 which is perpendicularly connected to the extension rod 102. Pivot 114 is located on the extension rod 102 to allow the extension rod 102 to pivot as a result of the interaction of the capture surface 100 with the wind.

FIG. 4*i* is a top view that shows one embodiment of the wind alignment mechanism of the present invention. The wind alignment mechanism 98 is mounted on the structural component 99. A wind capture surface (not shown) is connected through extension rod 102. The extension rod 102 is operably connected to the tower box 104 which includes or is connected to the motor controller by the angular connection rod 106 which is perpendicularly connected to the extension rod 102. Pivot 114 is located on the extension rod 102 to allow the extension rod 102 to pivot as a result of the interaction of the capture surface (not shown) with the wind.

Figure 5A:
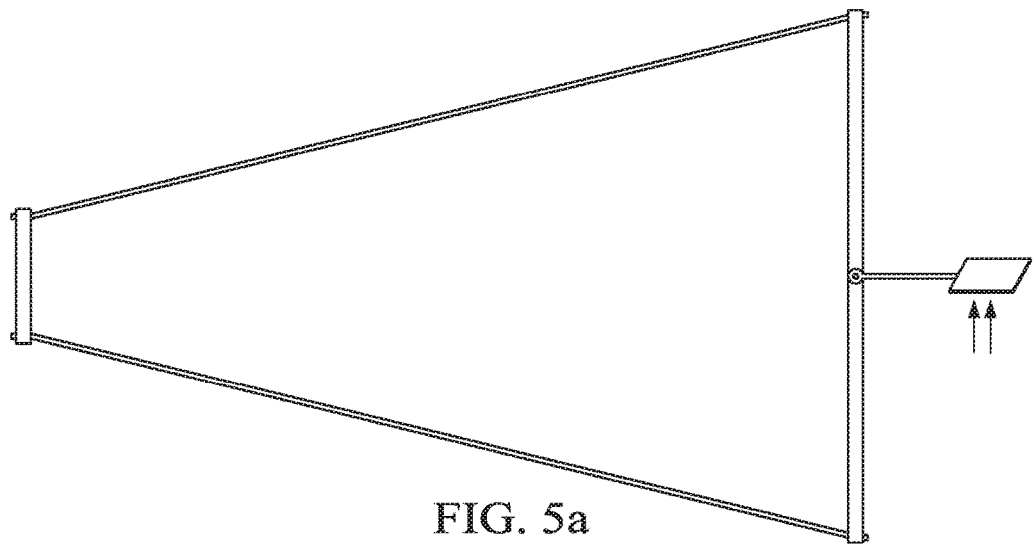
FIGS. 5a-5n show schematics of the junction between the wind force capture geometry and the alignment linkage.
Figure 5B:
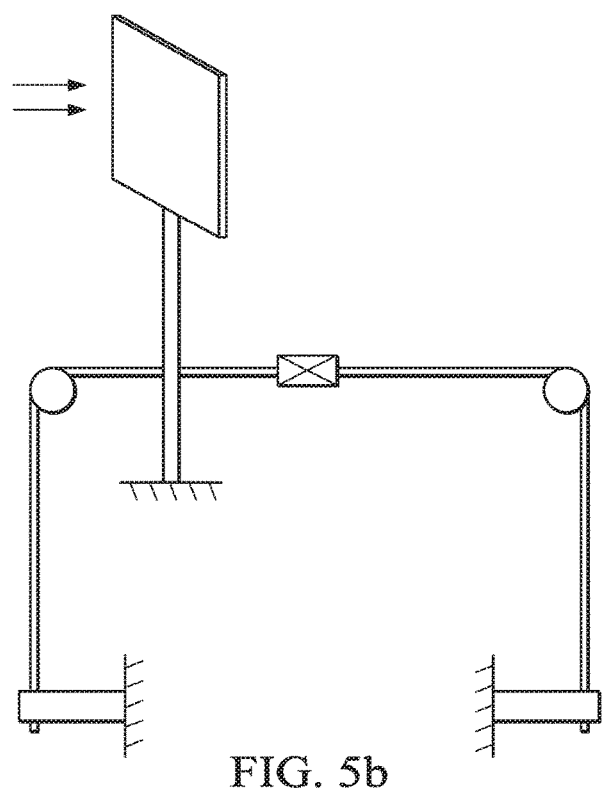
Figure 5C:
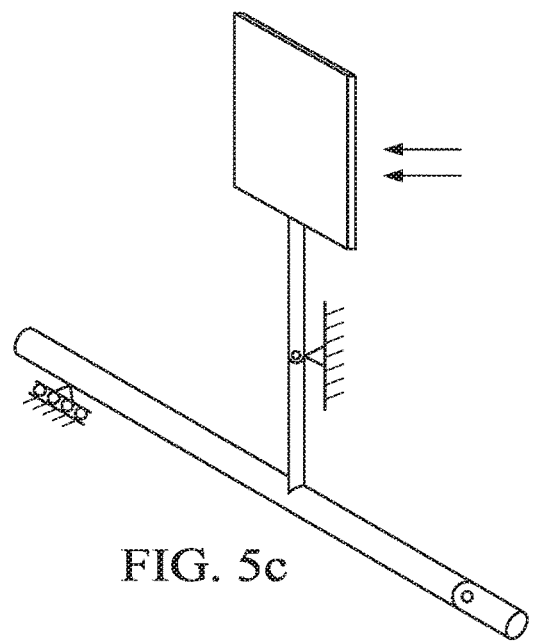
Figure 5D:
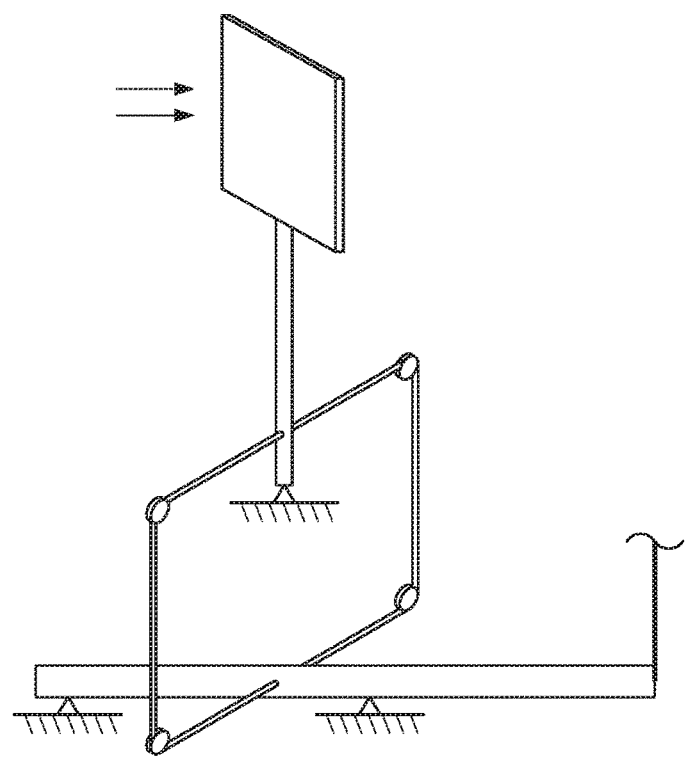
Figure 5E:
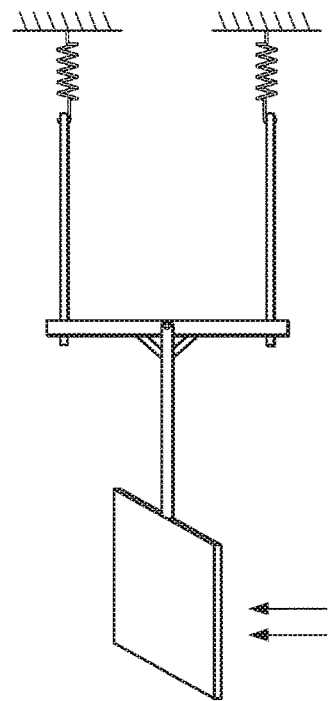
Figure 5F:
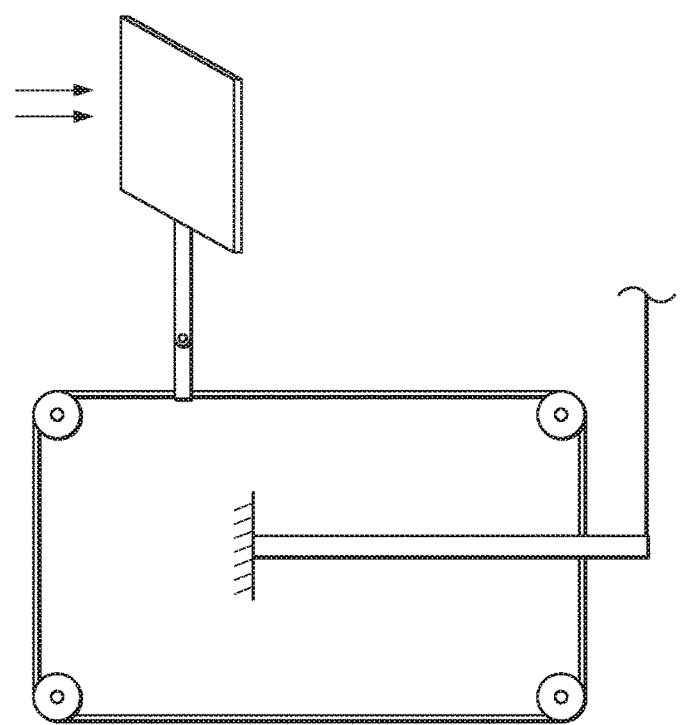
Figure 5G:
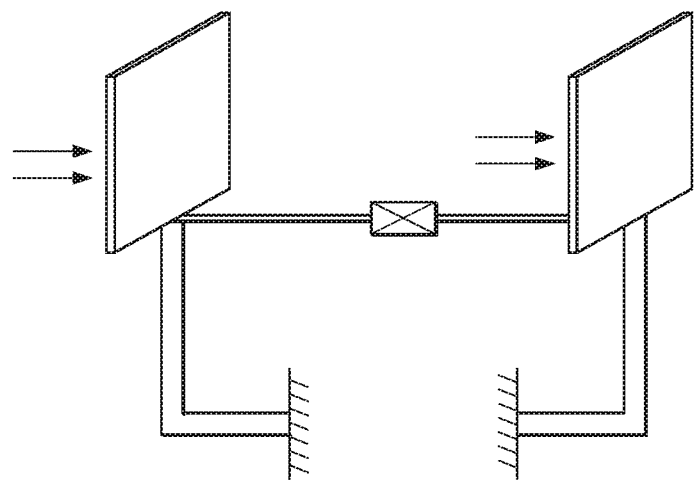
Figure 5H:
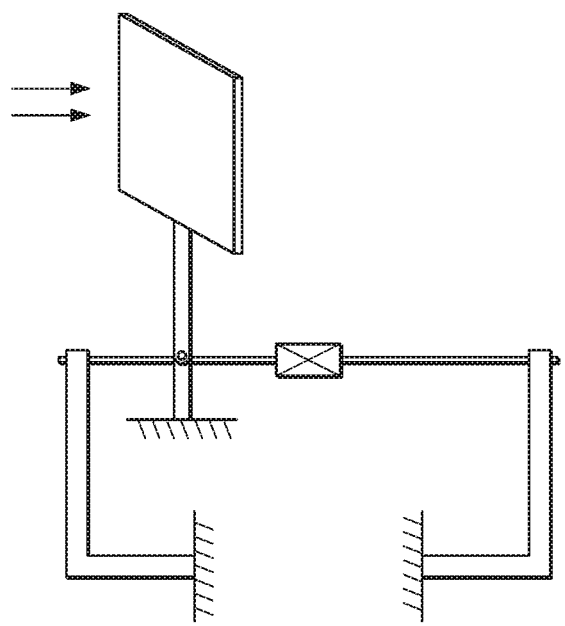
Figure 5I:
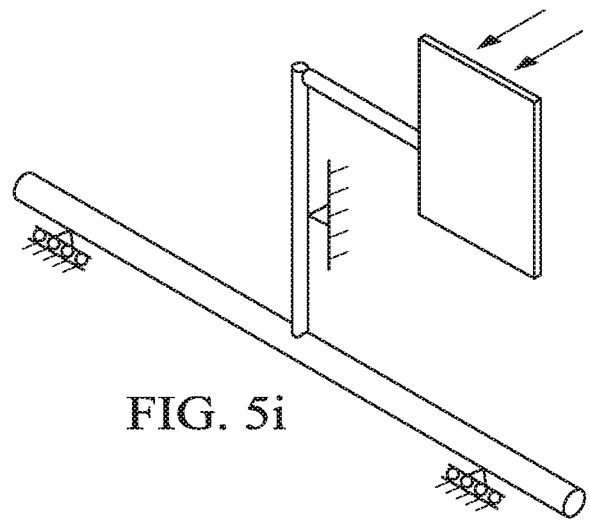
Figure 5J:
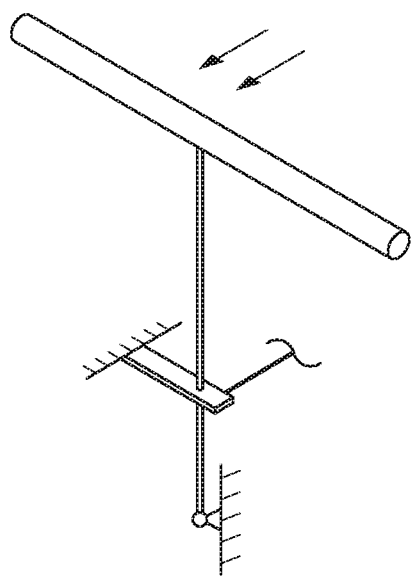
Figure 5K:
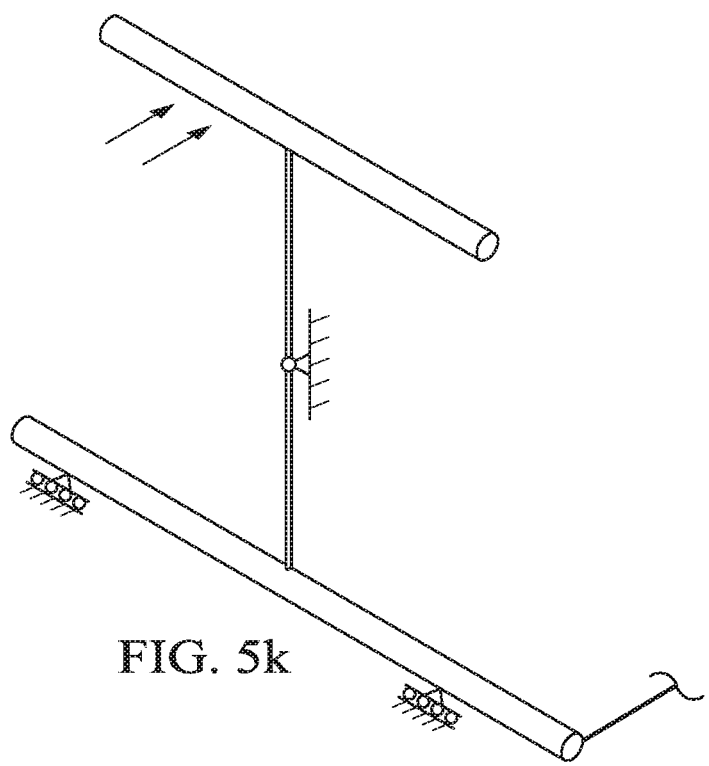
Figure 5L:
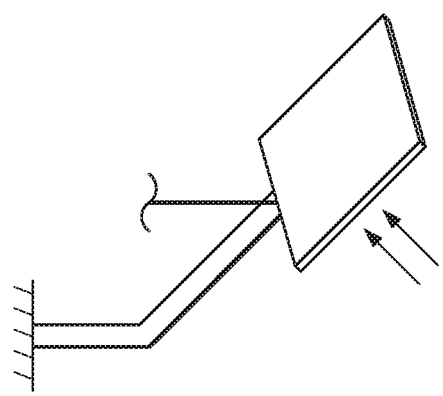
Figure 5M:
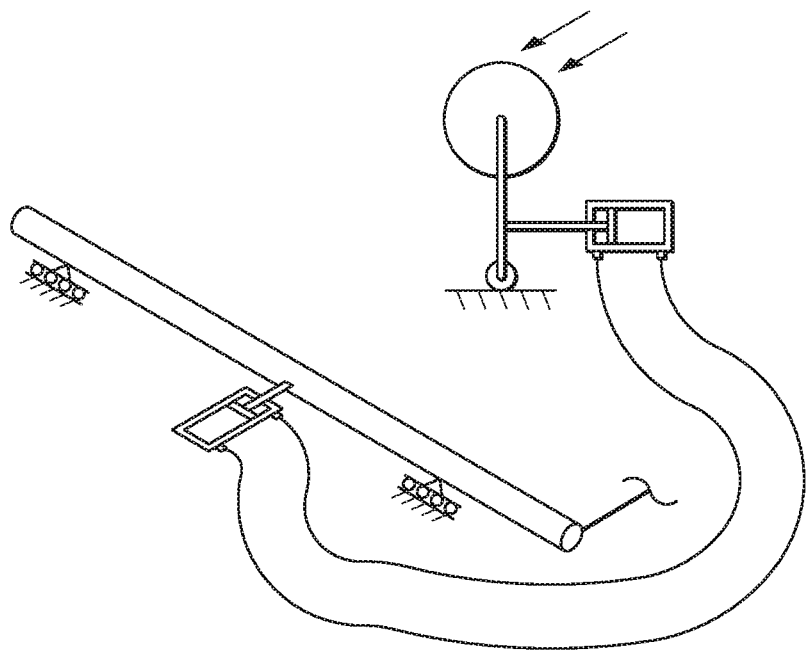
Figure 5N:
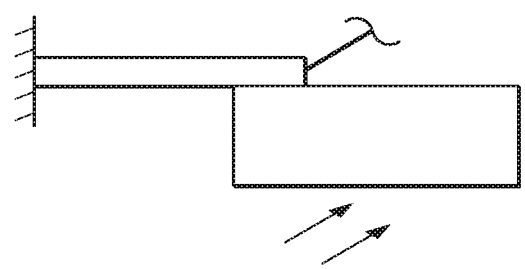
Figure 6:
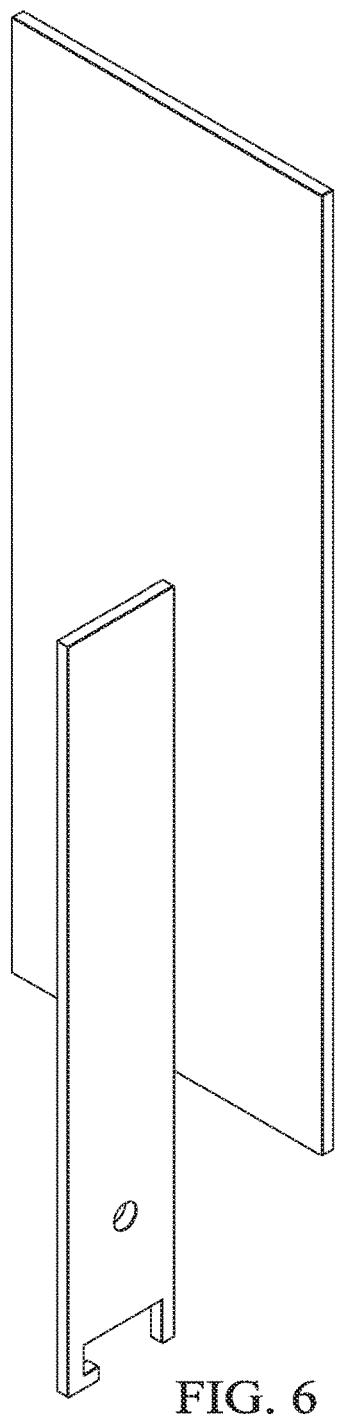
FIG. 6 is an image of one embodiment of the wind vein.
Figure 7:
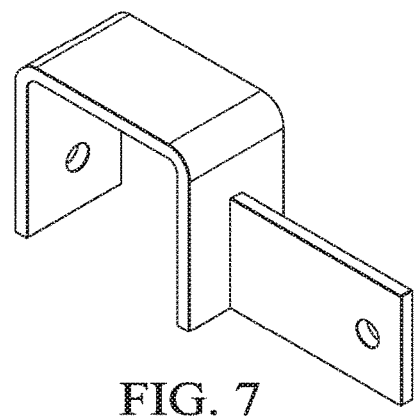
FIG. 7 is an image of the isometric base used in the instant invention.

FIGS. 5a-5n show schematics of the junction between the wind force capture geometry and the alignment linkage.

The present invention is a wind adjustment device that takes into account the wind on the water pipe mainline segments and elongated truss spans located between the mobile support towers. Although there are mechanisms to take into account alignment issues with the mobile support towers, there are currently no mechanisms to take into account the misalignment of the mobile support towers as a result of the wind curving the water pipe mainline segments and elongated truss spans located between the mobile support towers.

The present invention provides a mechanism to adjust the position of the mobile support towers to offset the curvature induced from the force of the wind pushing against the water pipe mainline segments and elongated truss spans located between the mobile support towers.

The present invention includes a wind detection device having a wind detection back surface and a wind detection front surface such that the wind can be detected in both the forward and backward direction. The wind detection device is of the size and shape to provide enough surface area for the wind to exhibit a force on the wind detection device. The wind detection device is in operable communication with the motor controller through the span alignment linkage. As a result, the wind detection device receives a force acting on it from the wind in a given direction, and as a result, moves the wind detection device in that direction. As the wind detection device moves it conveys a deflection that signals to the motor controller through the alignment linkage and activates the one or more drive motors as needed for correct alignment to move the mobile support towers. The repositioning of the mobile support towers results in a overall correction to the irrigation system. The water distribution conduit and elongated truss span straightening to remove the curvature induced by the force of the wind. The stronger the force of the find the stronger the signal to the motor controller and the more the movement of the mobile support towers by the one or more drive motors.

The wind detection device is of the size and shape to provide enough surface area for the wind to exhibit a force on the wind detection device. Any geometric shape can be used to obtain a force from the wind blowing on the shape. For example, the wind detection device may be a flat plate in a square, rectangular, circular, star, flag shape, Texas state outline, South Carolina state outline, free form or any other shape. In addition, 3 dimensional shapes can be used such as a sphere, pipe or other shape. The shape merely provides a surface to receive drag by the wind. As such it is irrelevant what the surface is only that it has the desired drag to allow movement in response to the direction of the wind.

The force resulting on the shape of the wind detection back surface and a wind detection front surface from the perpendicular wind component on the system is then transferred to a member of the alignment linkage, thus causing a strain on the linkage which will result in a correction of alignment to the overall system. Any forces caused by the parallel component of the wind should not be transferred to the alignment linkage, or transferred in such a manner as to not affect the alignment. The force may be transferred, scaled and amplified as needed, to the linkage in any conventional manner, including but not limited to: pivoting linkage, cable, hydraulic, rotating shaft, or by directly mounting the geometric shape to the linkage.

FIG. 8 shows the beam deflection equations to show the ideal situation for building a wind correction device.

Loading example 6 can be used to simulate the wind load on each individual span. From this the slope at the end of the span is:

$$\pm \frac{\omega L_1^3}{24 E_1 I_1}$$

Since the alignment linkage is aligning 2 spans the linkage will see twice the slope at the end.

$$\pm \frac{2\omega_1 L_1^3}{24 E_1 I_1}$$

On any given system span, everything is a constant except for $\omega$, therefore the slope is a direct linear function of $\omega$, and the slope seen by the alignment linkage would be:

$$c_1 \omega_1$$

If the correction device places a force on the alignment linkage as in diagram 4, then we want the slope at the end to equal $c_1 \omega$.

$$c_1 \omega_1 = \frac{P_2 L_2^2}{16 E_2 I_2}$$

On any given alignment linkage, everything is a constant except for P, therefore we have:

$$c_1 \omega = c_2 P_2$$

The total force on the span is:

$$P_1 = \omega_1 L_1$$

From this we know that the force applied to the alignment linkage must be:

$$P_2 = c P_1$$

The force on an object from the wind is:

$$P = C_d A V^2 c$$

Where $C_d$ is the drag coefficient, A is the cross sectional area, V is the wind speed, and c is a constant. As such, the geometric shape must only be designed such that the drag coefficient and cross sectional area provide a force such that:

$$P_2 = c P_1$$

which is always a perfect match because everything is linear in all the equations except for the $V^2$, which is a non-issue because both the system span and the geometric shape will always see the same velocity.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. An apparatus for aligning a movable irrigation system for use in irrigating crops and to account for misalignments due to wind comprising:
    an irrigation system comprising
    at least two spaced towers on wheels operable to transport said towers through a field as a unit, wherein each of the at least two spaced towers comprise
    a tower with a base resting on wheels,
    a drive motor in communication with at least one of the wheels to move each tower through the field,
    a motor control mechanism connected to the drive motor to control the direction and speed or timing of the drive motor,
    a conduit structure connected to the tower and spanning to an adjacent tower,
    a flexible conduit connection to connect each conduit structure to the adjacent conduit structure,
    an alignment sensing mechanism connected to the conduit structure to determine variation in the conduit caused by the tower lagging behind or moving ahead of the adjacent tower,
    a conduit alignment control mechanism connected to the alignment sensing mechanism and the motor control mechanism to control the direction and speed or timing of the drive motor to move each tower through the field and maintain the alignment of the conduit structure, and in response to the alignment sensing mechanism the conduit alignment control mechanism stops the drive motor of the tower if the tower is ahead of the adjacent tower or starts the drive motor if the tower is behind of the adjacent tower, until the alignment is re-established; and
    a wind sensing mechanism positioned between the at least two spaced towers and connected to the alignment sensing mechanism to move in response to the force and direction of the wind,
    wherein the movement of the wind sensing mechanism causes the alignment sensing mechanism to register a variation in the conduit structure caused by a bow in the conduit structure caused by the wind and result in the conduit alignment control mechanism moving the tower through the field to maintain the alignment of the conduit structure.

2. The device of claim 1, wherein the drive motor is an AC drive motor.

3. The device of claim 1, wherein the wind sensing mechanism is positioned between the tower and the adjacent tower.

4. The device of claim 1, wherein the wind sensing mechanism has a two dimensional shape.

5. The device of claim 1, wherein the wind sensing mechanism is a square, a circle, a panel, a non-uniformed shape, a free-form shape, a geometric shape or a combination thereof.

6. The device of claim 1, wherein the wind sensing mechanism has a three dimensional shape.

7. The device of claim 1, wherein the wind sensing mechanism is a "L" shape, a pipe, a tube a bar, a cylinder, a square tube, a flag, a wind vane or a combination thereof.

8. The device of claim 1, wherein the wind sensing mechanism is connected to the wind alignment control mechanism by a cable system.

9. The device of claim 1, wherein the wind alignment control mechanism is also the motor control mechanism.

10. The device of claim 1, wherein the wind sensing mechanism is connected to the motor control mechanism.

11. A method of aligning a movable irrigation system for use in irrigating crops to account for wind comprising the steps of:
    providing an irrigation system comprising
    at least two spaced towers on wheels operable to transport said towers through a field as a unit, wherein each of the at least two spaced towers comprise
    a tower with a base resting on wheels, a drive motor in communication with at least one of the wheels to move each tower through the field, a motor control mechanism connected to the drive motor to control the direction and speed or timing of the drive motor, a conduit structure connected to the tower and spanning to an adjacent tower, a flexible conduit connection to connect each conduit structure to the adjacent conduit structure, an alignment sensing mechanism connected to the conduit structure to determine variation in the conduit caused by the tower lagging behind or moving ahead of the adjacent tower, a conduit alignment control mechanism connected to the alignment sensing mechanism and the motor control mechanism to control the direction and speed or timing of the drive motor to move each tower through the field and maintain the alignment of the conduit structure in response to the alignment sensing mechanism; and a wind sensing mechanism positioned between each of the at least two spaced towers and connected to the alignment sensing mechanism, wherein the wind sensing mechanism moves in response to the force and direction of the wind and causes the alignment sensing mechanism to register a variation in the conduit structure caused by a bow in the conduit structure caused by the wind and results in the conduit alignment control mechanism moving the tower through the field to maintain the alignment of the conduit structure;

moving the wind sensing mechanism in response to a wind force;

moving the alignment sensing mechanism in response to the movement of the wind sensing mechanism; and wherein the conduit alignment sensing mechanism causes the alignment control mechanism to activate the drive motor to move the tower through the field to maintain the alignment of the conduit structure and to counter bow in the conduit structure from the wind.

12. The device of claim 1, wherein the motor control mechanism slightly adjusts the speeds of the towers of a continual movement irrigation system.

\* \* \* \* \*